April 27, 1926. 1,582,300
S. OTIS
PROCESS AND APPARATUS FOR PURIFYING BLOWN-OFF BOILER WATER
Filed Oct. 12, 1922 3 Sheets-Sheet 1
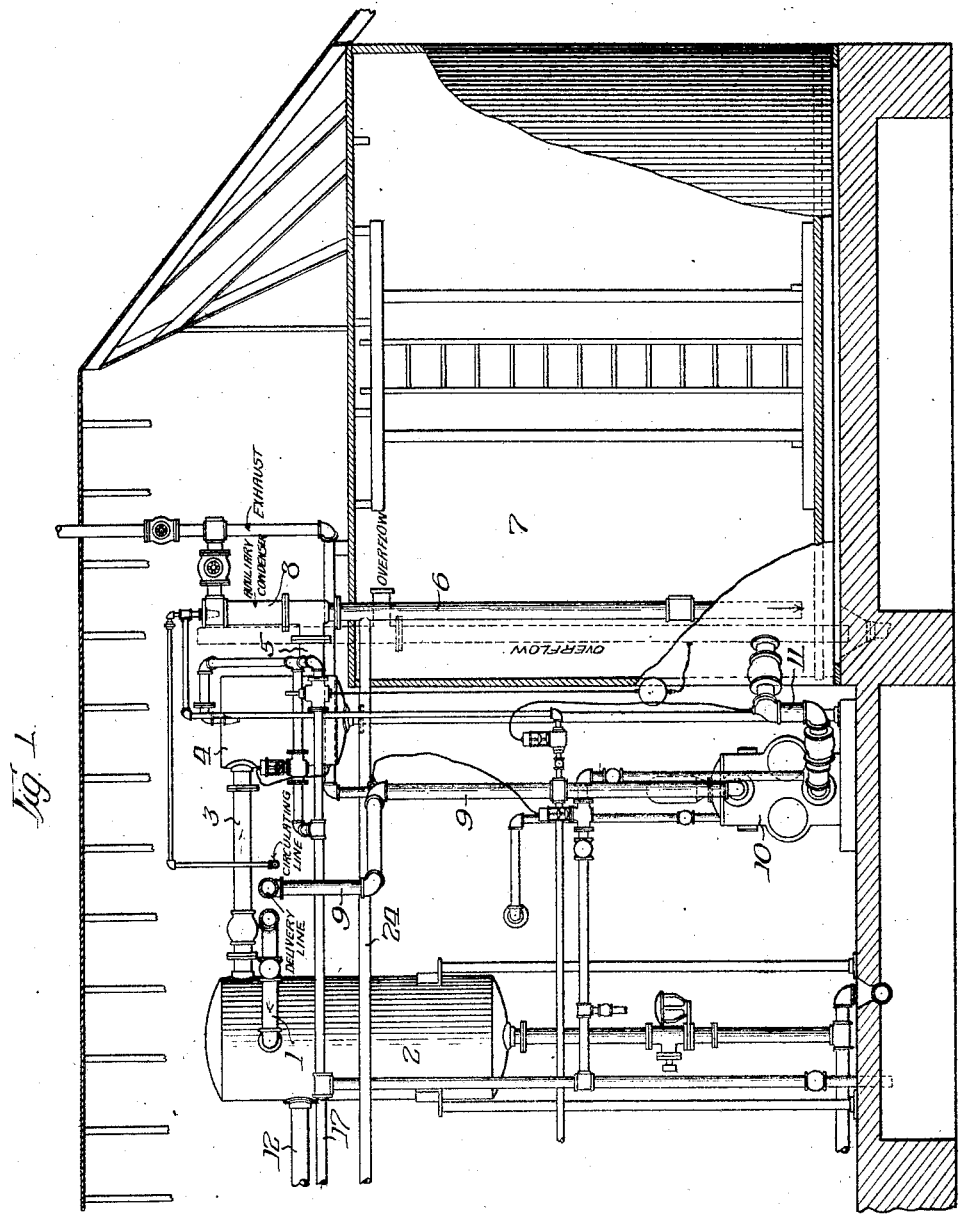

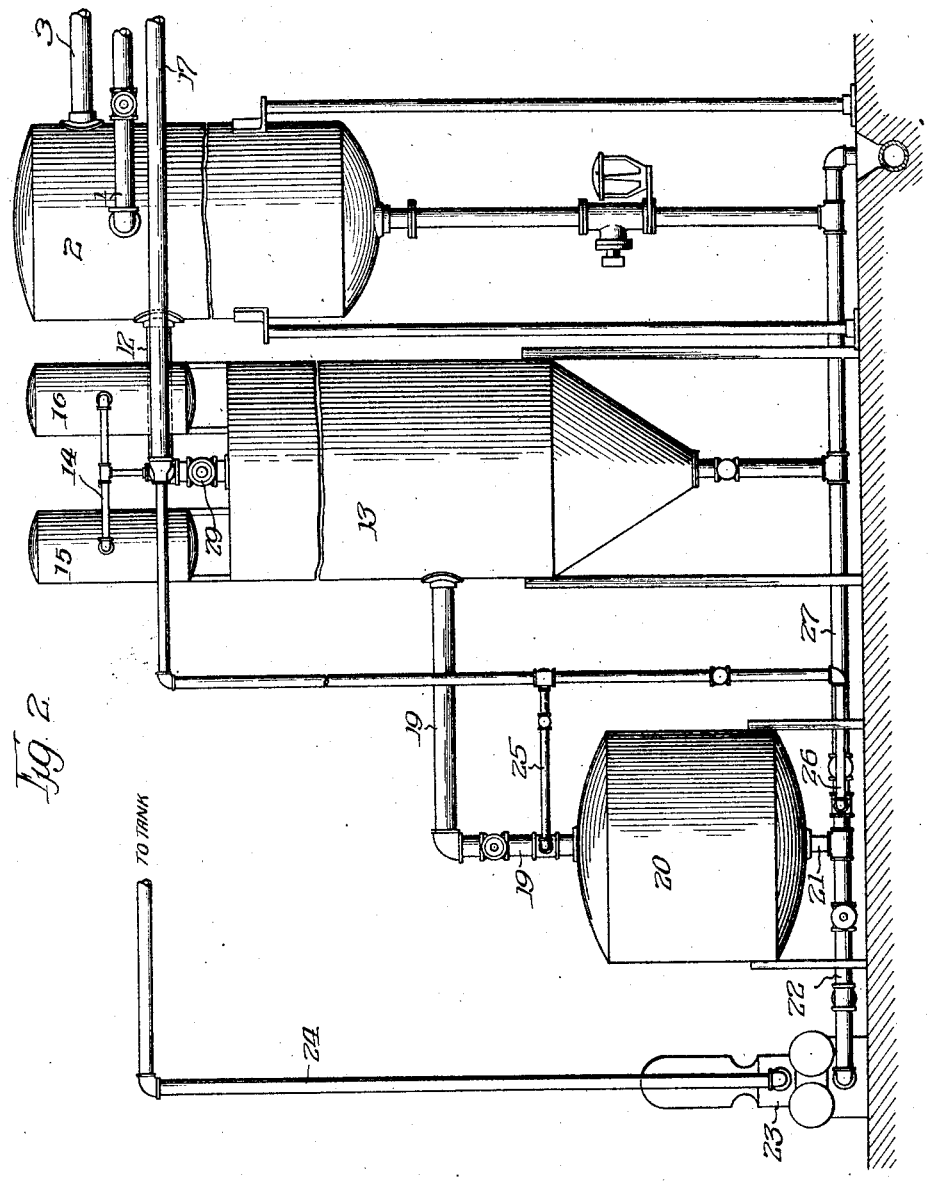

April 27, 1926.
S. OTIS
1,582,300
PROCESS AND APPARATUS FOR PURIFYING BLOWN-OFF BOILER WATER
Filed Oct. 12, 1922  3 Sheets-Sheet 3
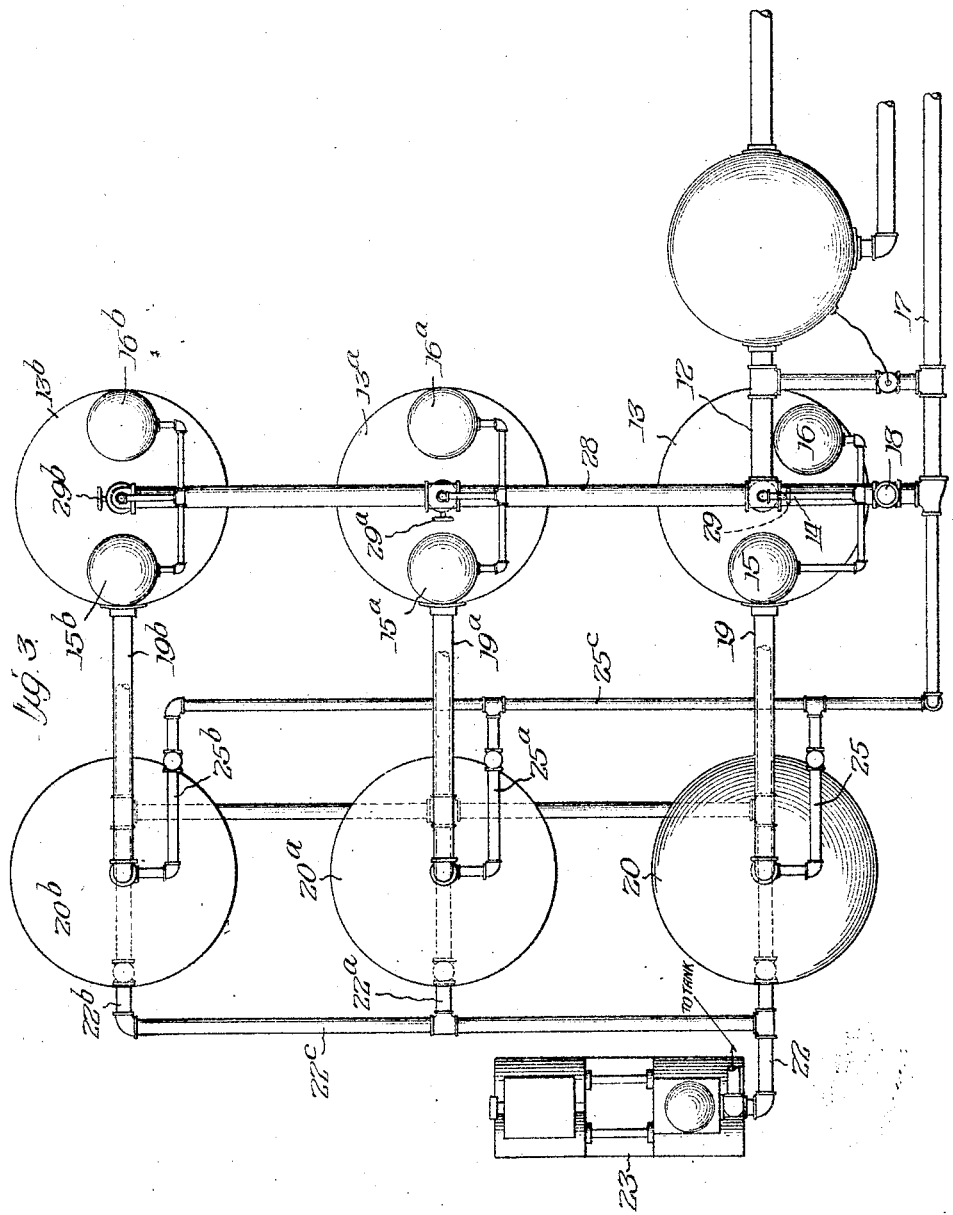
Witness:
Inventor:
Spencer Otis,
By Wilkinson, Huxley, Byron & Knight
Attys Patented Apr. 27, 1926.

1,582,300

UNITED STATES PATENT OFFICE.

SPENCER OTIS, OF BARRINGTON, ILLINOIS.

PROCESS AND APPARATUS FOR PURIFYING BLOWN-OFF BOILER WATER.

Application filed October 12, 1922. Serial No. 593,943.

*To all whom it may concern:*

Be it known that I, SPENCER OTIS, a citizen of the United States, residing at Barrington, in the county of Cook and State of Illinois, have invented certain new and useful Improvements in Processes and Apparatus for Purifying Blown-Off Boiler Water, of which the following is a specification.

This invention is intended for use in connection with locomotive blowoff apparatus in which blown off products pass to a separator where the volatiles are released to a condenser for transfer of heat units thereof to fresh water stored for refilling purposes, and the liquid is also saved for re-use in the boiler.

The object of the invention is to provide means whereby the recovered liquid of the blown off products can be treated to precipitate impurities therein and better adapt the water for re-use in the boiler.

In the operation of locomotive boilers, the boiler may be refilled a number of times before the locomotive can be returned to the roundhouse for blowing off, cleaning, and refilling, and each boilerfull of water that is evaporated leaves behind it impurities originally contained in the filling water. Most of this material can be eliminated in the form of sludge in the separator into which the blown off products are collectively delivered, but considerable percentage thereof remains in solution or in suspension and passes out with the water from the separator, so that if this water is to be re-used for boiler filling purposes it becomes desirable to further eliminate impurities therefrom. Water passing out from the separator in a blowoff system as generally employed is at a temperature approximating the boiling point. This circumstance is taken advantage of in the present process in that it permits of the addition of fresh water in carrying on the process without reducing the ultimate temperature of the storage water below the permissible degree.

The invention proceeds upon the principle of taking the fluid portion of the blown off products, passing the same into mixing relation with reagents that are adapted to precipitate foreign matter contained therein, passing the chemically treated water through a precipitation tank, and thence through a filter, and finally delivering the resultant water to the storage tank.

In the accompanying drawings in which apparatus for practicing the invention is illustrated schematically—

Figure 1 is a side elevation of that portion of the apparatus embracing the separator, the condenser, the storage tank, and the parts immediately concerned therewith.

Figure 2 is a side elevation of that portion of the apparatus which embraces the separator shown in Figure 1, the settling chamber surmounted by the reagent receptacles, the filter, and the pump for forwarding the purified water to the tank.

Figure 3 is a plan view of parts shown in Figure 2, together with additional settling tanks and filters arranged with the settling tank and filter of Figure 2 in manifold.

Referring more particularly to Figure 1, 1 represents a blowoff pipe adapted to deliver combined sludge, water, steam and vapor of a locomotive boiler to a separator 2, from which volatiles escape through a crossover pipe 3 to condenser 4, whence water of condensation escapes through pipes 5 and 6 into the storage tank 7. 8 represents an auxiliary condenser hereinafter referred to, which may also discharge into the pipe 6. 9 represents a hot water delivery line through which water is forced to the locomotive stations in the terminal house by means of a pump 10, the suction side of which is connected through pipe 11 with the tank 7.

The apparatus thus far described will in practice have associated with it various attachments for rendering automatic control of the several functions, particularly in the matter of supplying condensing water to the condenser, steam to the pumping engine in proportion to the load on the line, cold water for tempering the water in the delivery line, etc.

As shown more clearly in Figures 2 and 3, the liquid portion of the blown off products escapes from the boiler through a pipe 12 into a settling chamber 13. In passing to said settling chamber it meets the reagent pipe 14 from the containers 15 and 16 of reagents appropriate to the particular impurities to be dealt with, for instance, soda ash and lime, so that passing into the settling chamber 13 the water is in especially advantageous condition for precipitation of its impurities. In order to discharge the reagents into the body of water passing through the pipe 12, the cold water pipe 17 is likewise adapted to deliver into the pipe 14 in a measure determined by the adjustment of valve 18, thus not only providing a vehicle for the reagents but an increment of water from the fresh source. This increment of fresh water reduces the temperature of the blow off water to a degree more appropriate to the uses to which it is to be put, favors precipitation of impurities by the drop in temperature, increases the volume of available water, and subjects the additional volume to chemical treatment along with the blown off water.

From the precipitating tank 13 the treated water escapes through a pipe 19 into a filter 20, which it leaves through a pipe 21 connected with the intake pipe 22 of a pump 23 which forwards the purified water through pipe 24 to a place of storage, preferably the tank 7 already referred to. Tapped into the pipe 19 is a fresh water pipe 25 through which additional fresh water may be introduced to flush the filter. Similarly, water pipe 26 is tapped into the waste pipe 27 for flushing the latter.

Pipe 24, through which purified water is delivered to the tank 7, is preferably tapped into the pipe 6. While that portion of the water in tank 7 which comes in with the precipitated heat units of the vapor has not been treated the volume coming over through the pipe 24 is so large in proportion that it leaves the percentage of impurities very low. Moreover raising of the temperature of the fresh water which comes in from the condenser favors precipitation of any impurities therein within a very short time after the water reaches a state of rest in the tank 7.

In order to increase the capacity of the settling and filtration of the treated water, a manifold pipe 28 extends from the end of pipe 12 to additional precipitation tanks 13$^a$, and 13$^b$, each of which is supplied with reagent containers 15$^a$, 16$^a$, and 15$^b$, 16$^b$. Valves 29, 29$^a$ and 29$^b$ permit the several settling chambers to be closed off from the manifold delivery pipe 28 so that the settling tanks 13, 13$^a$, and 13$^b$ can be used separately and independently, and while one is in use the others can be left in an undisturbed state for the proper procedure of the settling operation. Opening of valve 18 admits water from pipe 17 through the manifold 28; hence, any settling tank that is opened through the medium of its valve 29, 29$^a$, or 29$^b$ will receive water in the proportion determined by the adjustment of said valve 18.

Settling tanks 13$^a$ and 13$^b$ have connecting pipes 19$^a$ and 19$^b$ with filters 20$^a$ and 20$^b$ just as described in connection with the settling tank 13 and filter 20; and, similarly, water pipes 25$^a$ and 25$^b$ branching from the manifold 25$^c$ are adapted to flush the filters 20$^a$ and 20$^b$ as already described in connection with filter 20.

Finally, manifold pipe 22$^c$ connects the discharge pipes 22$^a$ and 22$^b$ with the intake of the pump in the manner already described in connection with filter 20.

I claim:

1. The process of purifying water blown off from boilers, which consists in taking blown off water while at high temperature, adding a reagent thereto, adding an increment of fresh water to temper the water being treated, subjecting the combined volume of water and reagent to settlement in a precipitation chamber, and then subjecting the resultant treated water to filtration.

2. The process of treating blown off products from steam boilers, which consists in delivering the products to a separator, withdrawing and precipitating the volatiles thereof and delivering the resultant water of precipitation to storage, withdrawing the water constituent of the blown off products while still retaining high temperature, adding a reagent thereto, subjecting the resultant water and reagent to settlement in a precipitation chamber, then subjecting the resultant treated water minus its precipitate to filtration, and finally delivering the purified water to and mixing it with the aforesaid water of precipitation in storage.

3. In a boiler blowoff system, a separator, a condenser receiving and condensing volatiles from said separator, a storage tank receiving water of condensation from said condenser, means for delivering water from said separator, means for chemically treating water so delivered, and means for delivering the chemically treated water to said tank.

4. In a boiler blowoff system, a separator receiving hot water from the boiler, means for delivering hot water from said separator, means for mixing fresh water with the hot water so delivered, means for incorporating a reagent in the resultant mixture of water, a precipitating chamber receiving the water with the reagent, and means for disposing of water from said precipitating chamber.

5. In a boiler blowoff system, the combination of a separator, a plurality of precipitating chambers jointly connected with said separator and each adapted to receive water therefrom, means for adding reagent to water entering the respective precipitating chambers, and filtering means receiving water from said precipitating chambers; means being provided for adding an increment of fresh water to the water entering the several precipitating chambers.

Signed at Chicago, Illinois, this 7th day of October, 1922.

SPENCER OTIS.